United States Patent
Lee (10) Patent No.: US 12,552,253 B2
(45) Date of Patent: Feb. 17, 2026

(54) VEHICLE AND A METHOD OF CONTROLLING A DISPLAY TO OUTPUT A VISUAL INDICATION FOR INDUCING SELECTION OF A SPECIFIC DRIVING MODE

(71) Applicants: HYUNDAI MOTOR COMPANY, Seoul (KR); KIA CORPORATION, Seoul (KR)

(72) Inventor: Hyejoo Lee, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 160 days.

(21) Appl. No.: 18/224,661

(22) Filed: Jul. 21, 2023

(65) Prior Publication Data

US 2024/0066988 A1    Feb. 29, 2024

(30) Foreign Application Priority Data

Aug. 30, 2022  (KR) .................. 10-2022-0108954

(51) Int. Cl.
| | |
|---|---|
| *B60K 35/28* | (2024.01) |
| *B60K 35/22* | (2024.01) |
| *B60K 35/81* | (2024.01) |
| *B60L 3/12* | (2006.01) |
| *B60W 50/08* | (2020.01) |

(52) U.S. Cl.
CPC ............... *B60K 35/28* (2024.01); *B60L 3/12* (2013.01); *B60W 50/082* (2013.01); *B60K 35/22* (2024.01); *B60K 35/81* (2024.01)

(58) Field of Classification Search
CPC ........ B60K 35/00; B60K 35/22; B60K 35/81; B60K 2360/169; B60K 2360/172; B60K 2360/1876; B60K 35/28; B60L 3/12; B60L 58/12; B60W 50/082
See application file for complete search history.

(56) References Cited

U.S. PATENT DOCUMENTS

| | | | | |
|---|---|---|---|---|
| 2017/0072938 A1* | 3/2017 | White | ................. | B60K 6/48 |
| 2019/0243361 A1* | 8/2019 | Yabuuchi | ............. | G08G 1/0965 |
| 2022/0294495 A1* | 9/2022 | Chen | ................... | H04B 17/309 |
| 2023/0094310 A1* | 3/2023 | Zhao | ...................... | B60L 58/14 |
| | | | | 701/22 |
| 2023/0150394 A1* | 5/2023 | Diamond | ................ | B60L 58/14 |
| | | | | 701/22 |
| 2023/0331226 A1* | 10/2023 | Diamond | ............ | B60W 50/082 |
| 2024/0286491 A1* | 8/2024 | Gatti | ...................... | B60L 1/003 |

* cited by examiner

*Primary Examiner* — James J Lee
*Assistant Examiner* — Alexander George Matta
(74) *Attorney, Agent, or Firm* — Lempia Summerfield Katz LLC (57) ABSTRACT

A vehicle includes: a display, and a controller configured to control the display to output a visual indication for inducing selection of a predetermined first driving mode in response to a charge amount of a battery being greater than or equal to a predetermined value when at least one of location information of the vehicle or destination information of the vehicle satisfies a predetermined condition.

14 Claims, 10 Drawing Sheets

FIG. 1

| Layout | | | |
|---|---|---|---|
| Course | Full Course (3.908km) | A Course (2.6km) | B Course (1.3km) |

VEHICLE AND A METHOD OF CONTROLLING A DISPLAY TO OUTPUT A VISUAL INDICATION FOR INDUCING SELECTION OF A SPECIFIC DRIVING MODE

CROSS-REFERENCE TO RELATED APPLICATION(S)

This application claims the benefit of and priority to Korean Patent Application No. 10-2022-0108954, filed on Aug. 30, 2022, the entire content of which are hereby incorporated herein by reference.

TECHNICAL FIELD

The present disclosure relates to a vehicle and a method for controlling the same, and more particularly, to a vehicle for providing convenience to a driver by proposing a driving mode suitable for a vehicle driving situation, and a method of controlling the same.

BACKGROUND

Generally, a circuit (or racing circuit) refers to a road in which a vehicle departs, travels on a course, and then returns to its original position, and has specific criteria according to the purpose of the circuit.

A circuit may be used for the racing of automobiles and may also be used to evaluate vehicle performance. Recently, as more circuits are available to the public, they are also simply used for hobbies in addition to racing and performance evaluation.

Most circuits, unlike general roads, do not have speed limits, allowing vehicles to maximize their speed. However, to maximize the speed of the vehicle, a driver needs to directly find a driving mode menu in which the output of the vehicle is maximized.

SUMMARY

Various embodiments of the present disclosure provide a vehicle configured for providing convenience to a driver by visually outputting information such as a vehicle driving mode suggestion or a remaining battery level after driving based on vehicle information, and a method of controlling the same.

Additional embodiments of the present disclosure are set forth in part in the following description and should be apparent from the description. Alternatively, additional aspects of the disclosure may be learned by practice of the present disclosure.

In accordance with an embodiment of the present disclosure, a vehicle includes a display, and a controller configured to control the display to output a visual indication for inducing the selection of a predetermined first driving mode in response to a charge amount of a battery being greater than or equal to a predetermined value when at least one of location information of the vehicle or destination information of the vehicle satisfies a predetermined condition.

The controller may be further configured to control the display to output the visual indication for inducing the selection of the first driving mode upon determining that the charge amount of the battery is greater than or equal to the predetermined value when the destination information of the vehicle is a circuit.

The controller may be further configured to control the display to output the visual indication for inducing the selection of the first driving mode upon determining that the charge amount of the battery is greater than or equal to the predetermined value when a distance between the vehicle and the circuit is less than or equal to a predetermined value.

The controller may be further configured to control the display to output the visual indication for inducing the selection of the first driving mode upon determining that the charge amount of the battery is greater than or equal to the predetermined value when any other vehicle sharing a location with the vehicle selects the first driving mode.

The controller may be further configured to control the display to output a visual indication for inducing charging of the battery when the charge amount of the battery is less than the predetermined value.

The controller may be further configured to calculate the charge amount of the battery after driving based on circuit information received from a server.

The controller may be further configured to calculate the charge amount of the battery based on session information on the circuit input from a driver.

The controller may be further configured to control the display to output a visual indication including at least one of a remaining battery level after driving according to the first driving mode or a remaining battery level after driving according to a general driving mode.

The controller may be further configured to generate a second driving mode in which the first driving mode is activated only in a straight section of the circuit based on the circuit information.

The controller may be further configured to control the display to output a visual indication for inducing the selection of the first driving mode or the second driving mode.

In accordance with another embodiment of the present disclosure, a method of controlling a vehicle is provided. The method includes: determining whether at least one of the location information of the vehicle or destination information of the vehicle satisfies a predetermined condition; determining, if satisfied, whether a charge amount of a battery is greater than or equal to a predetermined value; and controlling a display to output a visual indication for inducing selection of a predetermined first driving mode in response to the charge amount of the battery being greater than or equal to the predetermined value.

The method may further include controlling the display to output the visual indication for inducing the selection of the first driving mode upon determining that the charge amount of the battery is greater than or equal to the predetermined value when the destination information of the vehicle is a circuit.

The method may further include controlling the display to output the visual indication for inducing the selection of the first driving mode upon determining that the charge amount of the battery is greater than or equal to the predetermined value when a distance between the vehicle and the circuit is less than or equal to a predetermined value.

The method may further include controlling the display to output the visual indication for inducing the selection of the first driving mode upon determining that the charge amount of the battery is greater than or equal to the predetermined value when any other vehicle sharing a location with the vehicle selects the first driving mode.

The method may further include controlling the display to output a visual indication for inducing charging of the battery when the charge amount of the battery is less than the predetermined value.

The method may further include calculating the charge amount of the battery after driving based on circuit information.

The calculating of the charge amount may further include calculating the charge amount of the battery based on session information on the circuit input from a driver.

The controlling of the display may further include controlling the display to output a visual indication including at least one of a remaining battery level after driving according to the first driving mode or a remaining battery level after driving according to a general driving mode.

The method may further include generating a second driving mode in which the first driving mode is activated only in a straight section of the circuit based on the circuit information.

The method may further include controlling the display to output a visual indication for inducing the selection of the first driving mode or the second driving mode.

BRIEF DESCRIPTION OF THE DRAWINGS

These and/or other aspects of embodiments of the disclosure should be apparent and more readily appreciated from the following description of the embodiments, taken in conjunction with the accompanying drawings, in which.

DETAILED DESCRIPTION

Reference is now made in detail to the embodiments of the disclosure, examples of which are illustrated in the accompanying drawings. Like reference numerals refer to like elements throughout. This specification does not describe all elements of the disclosed embodiments and detailed descriptions of what is well known in the art or redundant descriptions of substantially the same configurations have been omitted. The terms 'part', 'module', 'member', 'block', and the like as used in the specification may be implemented in software or hardware. Further, a plurality of 'part', 'module', 'member', 'block', and the like may be embodied as one component. It is also possible that one 'part', 'module', 'member', 'block', and the like includes a plurality of components.

Throughout the specification, when an element is referred to as being "connected to" another element, it may be directly or indirectly connected to the other element, and the "indirectly connected to" includes being connected to the other element via a wireless communication network.

Also, it should be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural unless it has a clearly different meaning in the context.

The reference numerals used in operations are used for descriptive convenience and are not intended to describe the order of operations and the operations may be performed in a different order unless otherwise stated.

When a component, device, element, or the like, of the present disclosure, is described as having a purpose or performing an operation, function, or the like, the component, device, or element should be considered herein as being "configured to" meet that purpose or to perform that operation or function.

Hereinafter, embodiments of the disclosure are described in detail with reference to the accompanying drawings.

Figure 1:
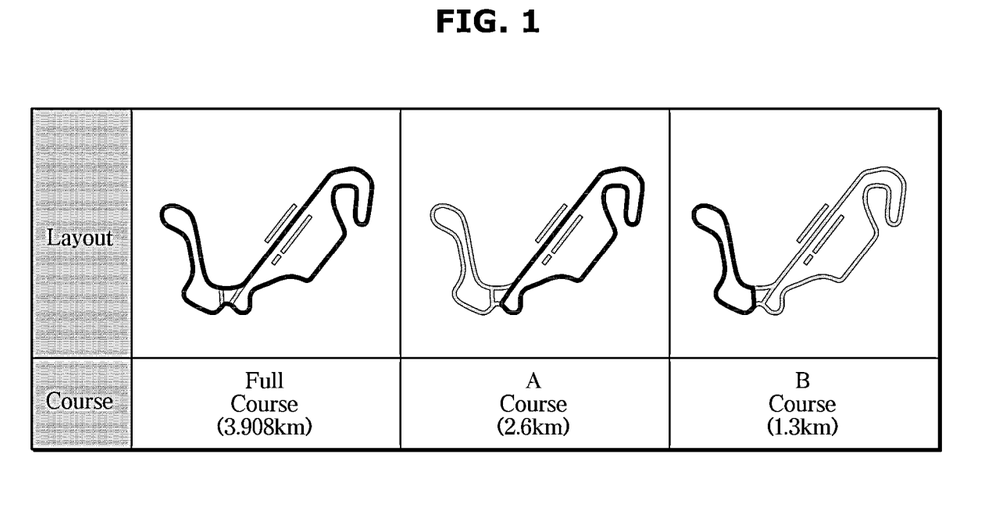
FIG. 1 is a view illustrating an example of a circuit.

FIG. 1 is a view illustrating an example of a circuit.

Referring to FIG. 1, a circuit may refer to a track for a driver to race cars, and a driving route may vary according to a plurality of courses even if the driver drives the same circuit.

Circuit information according to the disclosure may include information on each of a plurality of courses for driving the circuit as well as information on the circuit.

Figure 2:
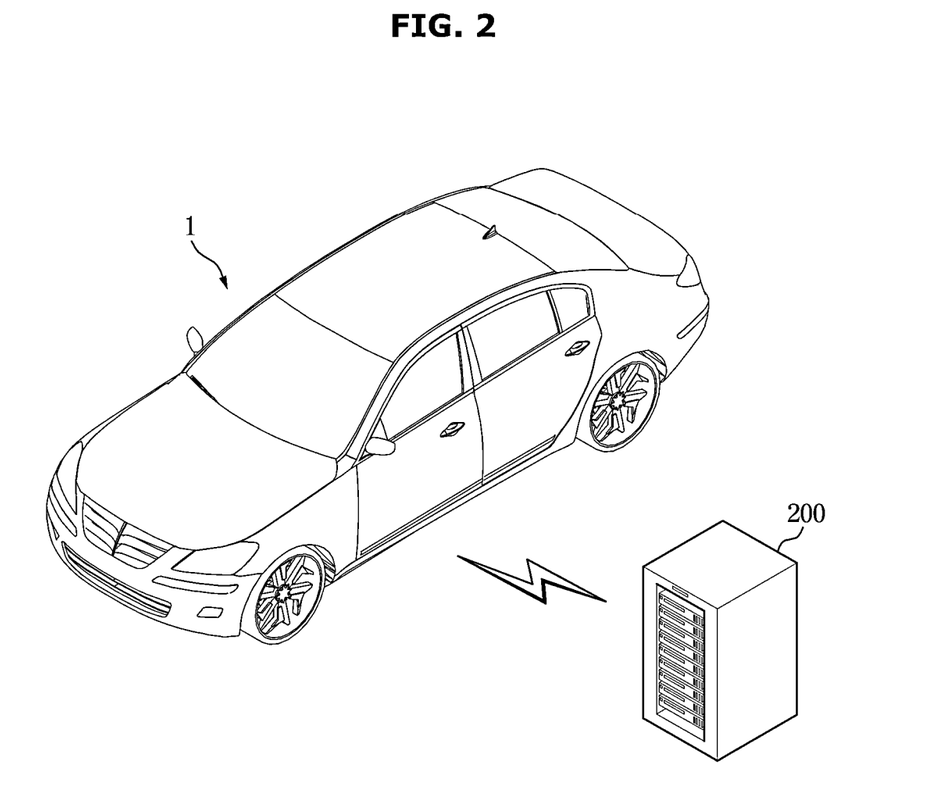
FIG. 2 is a schematic view illustrating a vehicle system according to an embodiment of the present disclosure.

FIG. 2 is a schematic view illustrating a vehicle system according to an embodiment of the disclosure.

Referring to FIG. 2, a vehicle system may include a vehicle 1 and a server 200. However, the vehicle system of FIG. 2 is only an embodiment of the disclosure. The disclosure is not limited thereto and may be configured differently from FIG. 2 according to various embodiments of the disclosure. In another embodiment, for example, the disclosure may further include a user terminal (not shown).

The vehicle 1, according to an embodiment, may include an electric vehicle (EV) that moves without an internal combustion engine, and a hybrid electric vehicle (HEV) that moves using a motor 400 as well as move an internal combustion engine, and a plug-in hybrid vehicle (PHEV) capable of receiving both fossil fuel and electric energy from the outside.

The vehicle 1 and the server 200 may be connected to each other through a network. The network refers to a connecting structure in which information may be exchanged between each node, such as terminals and servers, and includes a local area network (LAN), a wide area network (WAN), and a world wide web (WWW), wired and wireless data communication networks, telephone networks, and wired and wireless television networks, and the like.

The wireless data communication networks may include $3^{rd}$ Generation (3G), 4G, 5G, 3rd Generation Partnership Project (3GPP), long-term evolution (LTE), world interoperability for microwave access (WIMAX), wireless fidelity (Wi-Fi), a Bluetooth communication, an infrared communication, an ultrasound communication, a visible light communication (VLC), and light fidelity (Li-Fi), and the like.

The server 200 may process and store various data and may transmit and/or receive the processed data. More specifically, the server 200 may include a central server (not shown) and a circuit server (not shown). In addition, the central server (not shown) and the circuit server (not shown) may be connected to each other via a network.

The central server and the circuit server may be the same or separate servers. The central server may request the circuit server to update circuit information and may receive and update circuit information from the circuit server according to the update request.

Herein, the circuit information may refer to, for example, information on each of a plurality of courses for driving the circuit as well as information on the circuit. For example, the circuit information may include circuit course characteristic information, such as circuit course, cornering curvature, Apex, inclination, course length, accident information, and the like.

The central server may receive a circuit information request of the vehicle 1 and transmit the circuit information to the vehicle 1. In addition, the central server may transmit the location of the vehicle 1 to other vehicles and transmit the locations of other vehicles to the vehicle 1 according to a vehicle location sharing request between the vehicle 1 and other vehicles.

Furthermore, in response to any one vehicle selecting a first driving mode during a location sharing between the vehicle 1 and other vehicles, the central server may transmit a first driving mode selection signal to other vehicles.

For example, in response to another vehicle selecting the first driving mode during the location sharing between the vehicle 1 and other vehicles, the central server may transmit the fact that the first driving mode is selected from another vehicle during the location sharing to the vehicle 1. Herein, the first driving mode refers to a driving mode capable of maximizing an output of the vehicle 1 as described below.

The circuit server may be a server operating at least one circuit. Accordingly, the circuit server may be provided in plurality, but the disclosure is not limited thereto, and it is also possible for one circuit server to operate the plurality of circuits.

The circuit server may transmit circuit information to the central server. For example, the circuit server may transmit the circuit information to the central server as an update request from the central server is received.

Figure 3:
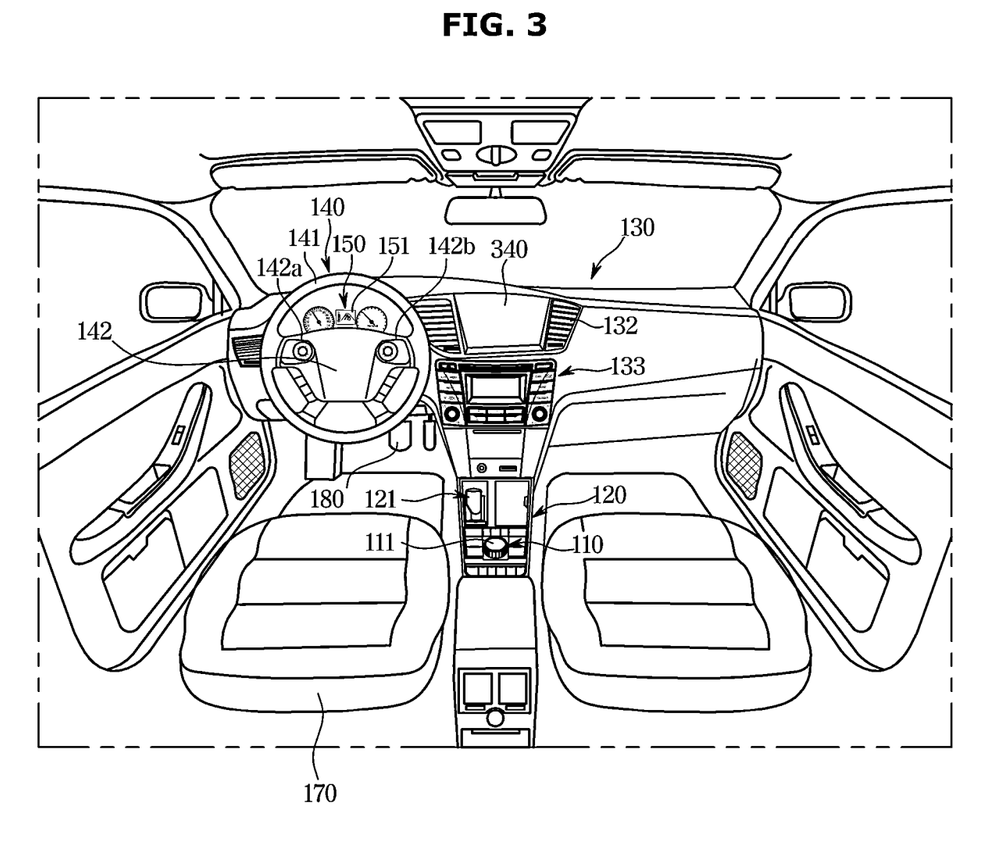
FIG. 3 is a view illustrating an internal configuration of a vehicle according to an embodiment of the present disclosure.

FIG. 3 is a view illustrating an internal configuration of a vehicle according to an embodiment of the disclosure.

The vehicle 1 may include a dashboard in which a gearbox 120, a center fascia 130, a steering wheel 140, and an instrument panel 150 are provided as shown in FIG. 3.

A gear lever 121 for shifting a vehicle may be installed in the gearbox 120. Furthermore, as shown in the drawings, the gearbox may include an input device 110 including a dial operator 111, and various buttons that allow a user to control functions of multimedia devices. These multimedia devices include a navigation device or an audio device 133. The input device can also implement major functions of the vehicle.

An air conditioner 132, the audio device 133, and the navigation device may be installed in the center fascia 130. Herein, the navigation device may be, for example, embedded in a display 340 or included in a controller to be described later.

The air conditioner maintains comfortably the inside of the vehicle by controlling the temperature, humidity, air cleanliness, and airflow inside the vehicle. The air conditioner may include at least one outlet installed in the center fascia 130 and discharging air.

The center fascia 130 may be provided with a button or a dial for controlling the air conditioning device, and the like. Users such as a driver may control the air conditioner of the vehicle by using the button or dial disposed on the center fascia.

The air conditioner may be controlled through the buttons of the input device 110 installed in the gearbox 120 or the dial operator 111.

For example, a navigation device may be installed in the center fascia 130. The navigation device may be embedded in the center fascia 130 of the vehicle. According to an embodiment of the disclosure, the input device for controlling the navigation device may be disposed in the center fascia.

According to various embodiments, the input part of the navigation device may be installed at a location except for the center fascia. For example, the input part of the navigation device may be formed around the display 340. Alternatively, the input part of the navigation device may be installed in the gearbox 120.

As another embodiment, the navigation device may be implemented as a head-up display that displays route guidance information including a driving route on a windshield. The head-up display may be implemented in a vehicle together with a navigation device formed by being embedded in the center fascia of the vehicle.

As still another embodiment, the navigation device may be implemented as a navigation function mounted on a mobile terminal having a communication function, such as a smartphone.

On the other hand, the navigation device, for example, may be built in the display 340 or provided integrally with the display.

The steering wheel 140 is a device for adjusting the driving direction of the vehicle. The steering wheel 140 is connected to a rim 141 gripped by the driver and a steering device of the vehicle and may include a spoke 142 connecting a hub of a rotation shaft for steering.

According to an embodiment, the spoke 142 may be provided with manipulation devices 142*a* and 142*b* for controlling various devices in the vehicle, for example, an audio device.

In addition, various instrument panels 150 that may display the driving speed, engine speed, or remaining fuel level of the vehicle may be installed on the dashboard. The instrument panel 150 may include the instrument panel display 340 for displaying states of the vehicle, information related to driving of the vehicle, information related to manipulation of a multimedia device, and the like.

On the other hand, the display 340 of the vehicle 1 may display a driving mode selection screen of the vehicle. Typically, in order for a driver to select the vehicle driving mode, the driver needs to select a desired vehicle driving mode from a vehicle driving mode menu through manipulation of the display 340. However, when the driving mode may not be selected due to insufficient battery charge, the driver needs to directly search for a charging station through the navigation device.

Accordingly, the disclosure may a vehicle and a method of controlling the vehicle configured for providing the driver with a visual indication for facilitating the selection of the vehicle driving mode, providing the driver with a visual indication for charging the battery when the vehicle 1 needs charging, and providing a remaining battery level after driving according to the driving mode so as to make the selection of the driving mode easier.

Hereinafter, this embodiment is described in detail with reference to FIGS. 4-9.

Figure 4:
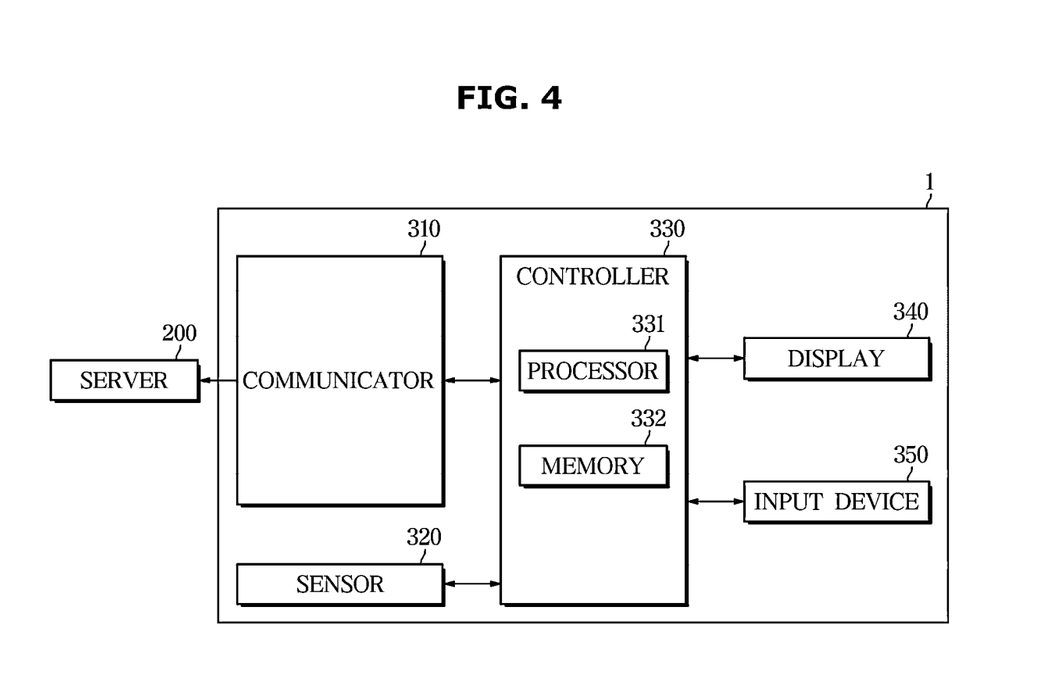
FIG. 4 is a block diagram illustrating a configuration of a vehicle according to an embodiment of the present disclosure.

FIG. 4 is a block diagram illustrating a configuration of a vehicle 1 according to an embodiment of the disclosure.

Referring to FIG. 4, a vehicle 1 according to an embodiment of the disclosure may include a communicator 310, a sensor 320, a controller 330, the display 340, and an input device 350.

Herein, the communicator 310 may be connected to the controller 330, the external server 200, a Global Positioning System (GPS) satellite, and/or a user terminal (not shown) by wire and/or wirelessly. Various types of communication such as Wi-Fi, Bluetooth, and Zigbee communication may be used as the wireless communication.

Accordingly, the communicator 310 may receive, from the external server 200, circuit information for the vehicle 1 to drive a circuit and charging station information that is information about a charging station for charging the battery of the vehicle 1, and the like, and transmit driving mode selection information of the vehicle 1 to the external server 200.

Furthermore, the communicator 310 may receive signals from a plurality of GPS satellites located above the earth to determine the current location of the vehicle. To this end, the communicator 310 may include a circuit board and/or a module to receive signals.

The sensor 320 may include various sensors, for example, a sensor for detecting an obstacle around the vehicle 1 to support the driver to recognize situation around the vehicle 1 or identifying location information of the vehicle 1.

For example, the sensor 320 may include a camera that obtains an image in front of the vehicle, a rear camera that obtains an image behind the vehicle, a side camera that obtains an image of the left and right sides of the vehicle, a distance sensor that detects a distance to an object in front of the vehicle, a GPS device that obtains information to recognize the location of a host vehicle, a gyro sensor, a geomagnetic sensor, an acceleration sensor, an inertial sensor, and a battery sensor for acquiring battery information of the vehicle, and the like.

Herein, the GPS device included in the sensor 320 may be, for example, obtaining the current location information of the vehicle 1 through wireless communication with the external server 200 and/or GPS satellites. In addition, the battery sensor included in the sensor 320 may obtain battery information including the current remaining battery capacity of the vehicle 1, a voltage signal, a current signal, and/or a temperature signal.

The controller 330 may include at least one memory 332 that stores a program for performing the above-described operations and an operation to be described later, and at least one processor 331 for executing the stored program.

The controller 330 may be electrically connected with the communicator 310, the sensor 320, the display 340, and the input device 350 of the vehicle 1 to each other.

For example, the communicator 310 may be connected to the controller 330 via a communication network for a vehicle (NT), or may be connected to the controller 330 via a hard wire. Herein, connecting electrical to each other may refer to that mutual data communication is available or power transmission/reception is available.

The processor 331 may receive data of a three dimensional (3D) navigation map around the vehicle 1 from the memory 332 based on the location information of the vehicle 1. The location of the vehicle may be determined, for example, by the sensor 320, such as a GPS or other location recognition system.

The data of the navigation map may include information regarding a proximity of the vehicle. Accordingly, the user may understand how the user or a moving object (e.g., a vehicle) may move to reach a desired destination.

Herein, information regarding near the vehicle may be, for example, a map section representing surroundings within a predefined range around a viewing position.

On the other hand, when the driver manipulates the input device 350, the processor 331 may provide navigation information based on the manipulation.

For example, the driver may receive guidance on the fastest route from the current location to the destination by inputting a place to which the driver wants to arrive, and may receive map information and various information for a specific location.

The processor 331 may process circuit information received from the external server 200 and location information of the vehicle 1 received from the sensor 320. As a result, the processor 331 may identify whether the vehicle 1 corresponds to an information provision condition.

For example, when the vehicle 1 approaches nearby the circuit, which may be regarded as for driving a circuit, so the processor 331 may suggest the driving mode selection.

More specifically, the information provision condition may correspond to a case in which: the destination of the vehicle 1 is set to the circuit, another vehicle sharing a location with the vehicle 1 selects the first driving mode, or a distance between the location of the vehicle 1 and the location of the circuit is smaller than a predetermined value.

However, the information provision condition is not limited thereto and may include a situation in which the vehicle 1 may be driven at maximum output.

Herein, the first driving mode refers to a driving mode in which the vehicle 1 may generate the maximum output.

When the vehicle 1 meets the information providing condition, the processor 331 may control the display 340 to output a visual indication for inducing the driving mode selection.

In addition, the processor 331 may determine whether the vehicle 1 may drive according to the first driving mode, based on processing the location information of the vehicle 1 obtained from the sensor 320 and the battery information.

For example, the processor 331 determines that selection of the first driving mode is available when the charge amount of the battery is 70% or more, and determines that selection of the first driving mode is unavailable when the charge amount of the battery is 70% or less.

When the driving according to the first driving mode is available, the display 340 may be controlled to output the visual indication for inducing selection of the first driving mode, and when the driving according to the first driving mode is unavailable due to insufficient battery charging, the display 340 may be controlled to output the visual indication for inducing charging of the battery.

Accordingly, when the vehicle 1 is driving on the circuit, the driver does not need to search for a menu for selecting the first driving mode, and if charging is required, the driver may immediately find a charging station.

On the other hand, the processor 331 may calculate a remaining battery level (also referred to as state of charge (SOC)) after driving based on the battery information obtained from the sensor 320 and the circuit information received from the server 200.

For example, after receiving the circuit details of Circuit A with, such as 7 cornering sections 7.3 km, 6 main straight sections 13.6 km, 4 uphill sections 3.4 km, 6 downhill sections 8.8 km from the server 200, the remaining battery level may be calculated. In other words, by calculating the remaining battery level after driving according to the circuit information, it is possible to more accurately calculate the remaining battery level after driving.

In addition, the processor 331 may calculate charge amount of the battery after driving based on session information on the circuit acquired through the input device 350. A session refers to the amount of time a driver can drive a circuit. In other words, the processor 331 may calculate the remaining battery level after driving according to the circuit information and the session information.

In addition, the processor 331 may calculate the remaining battery level according to the driving mode of the vehicle 1, and may control the display 340 to display the remaining battery level after driving according to the driving mode. Accordingly, the driver may make a circuit driving plan by referring to the remaining battery level after driving according to the driving mode.

On the other hand, the processor 331 may generate a second driving mode in which the first driving mode is activated only in a straight section of the circuit based on the circuit information obtained from the server 200.

More specifically, the second driving mode refers to a driving mode in which: the vehicle 1 drives at the maximum output only in the straight section, but drives in other sections while managing the battery temperature so as to more efficiently produce the maximum output of the vehicle 1 in the straight section. Accordingly, it is possible to reduce the amount of battery power consumed and efficiently use the charge amount of the battery.

In addition, the processor 331 may control the display 340 to output the visual indication for inducing selection of the first driving mode and the second driving mode. For example, the processor may induce the driver to select the driving mode by providing the remaining battery capacity after driving according to each driving mode.

The memory 332 stores map information and various information related to navigation. Among information received from the communicator 310, information required is stored in the memory and may be stored in the form of a database. For example, the memory 332 may store circuit information and data of the 3D navigation map.

The memory 332 may store a program for performing the above-described operations and an operation to be described later, and the processor 331 may execute the stored program.

When there is more than one memory 332 and processor 331, the memory 332 and the processor 331 may be integrated into one chip or may be provided in physically separate locations.

The memory 332 may include a volatile memory such as static random-access memory (S-RAM) or dynamic random-access memory (D-RAM) for temporarily storing data.

In addition, the memory 332 may include a non-volatile memory such as read-only memory (ROM), erasable programmable read-only memory (EPROM), and electrically erasable programmable read-only memory (EEPROM) for storing control programs and control data for a long period of time.

The processor 331 may include various logic circuits and arithmetic circuits, and may process data according to a program provided from the memory 322 and generate a control signal according to the processing result.

The display 340 may be located in the center fascia 130 that is the central area of the dashboard. Alternatively, in another embodiment, the display 340 may include a display of a mobile terminal such as a smart phone that provides a navigation function.

The display 340 according to the above-described embodiments of the disclosure, by using augmented reality technology, may display an image obtained by the front camera as a background and overlay images indicating information related to driving route onto the displayed background image.

Herein, the display 340 may employ a light emitting diode (LED) capable of self-emission, an organic light emitting diode (OLED), or a liquid crystal display (LCD) having a separate light emitting source.

Furthermore, the display 340 may employ a touch screen panel (TSP) that receives a control instruction from a user and displays operation information corresponding to the received control instruction.

The touch screen panel may include a display that displays motion information and control instructions that may be input by the user, a touch panel that detects coordinates touched by a part of a user's body, and a touch screen controller that determines a control instruction input by the user based on the touch coordinates detected by the touch panel.

The touch screen controller may recognize the control instruction input by the user by comparing the touch coordinates of the user detected through the touch panel with the coordinates of the control instruction displayed through the display. The input device 350 may not be separately required.

The input device 350 generally receives an instruction of the driver and transmits the received instruction to the controller 330. The driver may directly input an instruction to the controller 330 or may input an instruction by voice through a voice recognition function.

Accordingly, the input device 350 may include a touch screen including a touch panel or a microphone and a voice receiving device required for voice recognition so as to directly receive an instruction of the user.

The input device 350 may detect a touch manipulation applied to the touch panel and generate and output electrical signals based on the detected touch manipulation. The touch manipulation may be performed by a touch means, for example, a finger, a hand, or a touch pen. When a touch screen detects the touch means, the touch operation may be sensed in all areas where the screen is displayed.

In addition, the input method through the touch screen may employ a resistive touch screen method that detects a user's touch operation, a capacitive touch screen method that detects a user's touch operation using a capacitive coupling effect, an optical touch screen method using infrared rays, or an ultrasonic touch screen method using ultrasonic waves.

In addition, the user may operate the controller 330 by voice through the voice recognition function. Accordingly, the user may operate the vehicle 1 by voice without direct input while driving, thereby enabling safe driving.

FIGS. 5-9 are schematic views illustrating a screen displayed by the display of a vehicle according to an embodiment of the disclosure.

Figure 5:
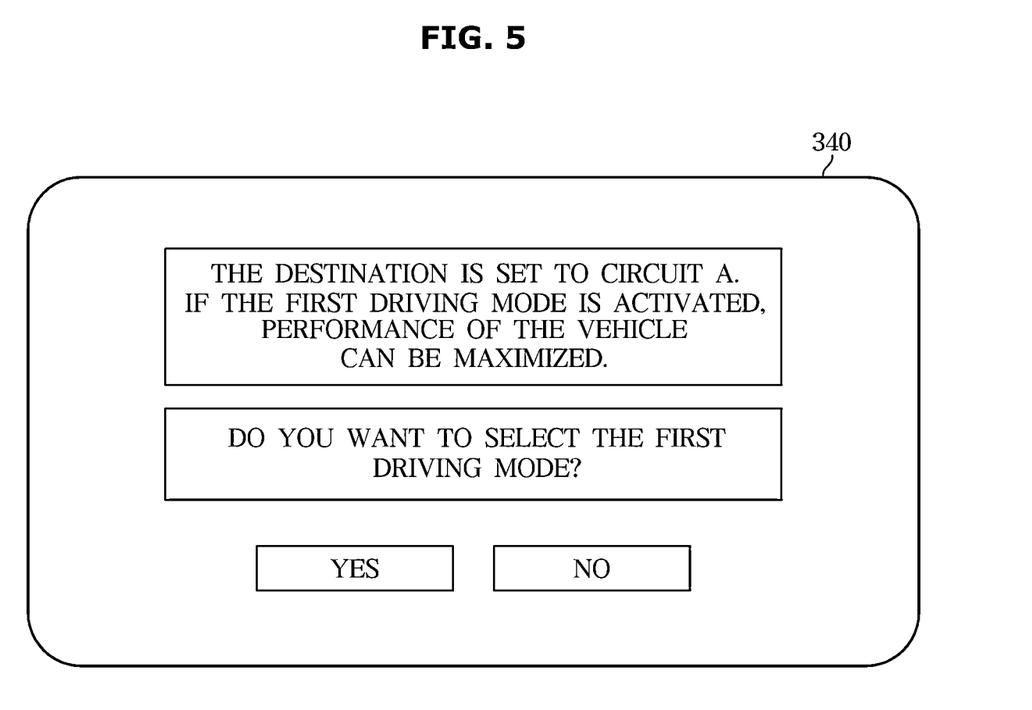
FIGS. 5-9 are schematic views illustrating a screen displayed by a display of a vehicle according to an embodiment of the present disclosure.
Figure 6:
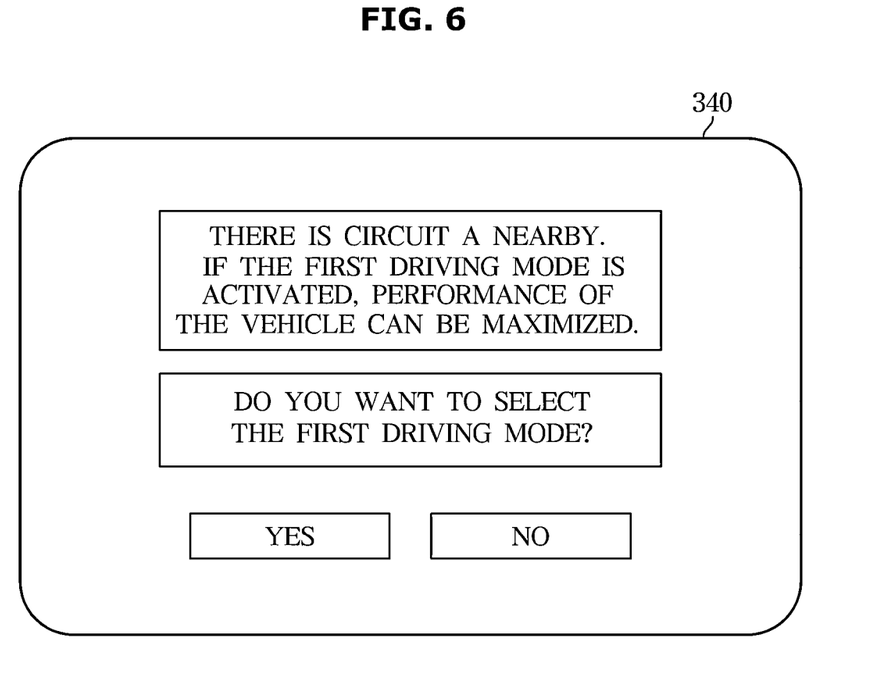
Figure 7:
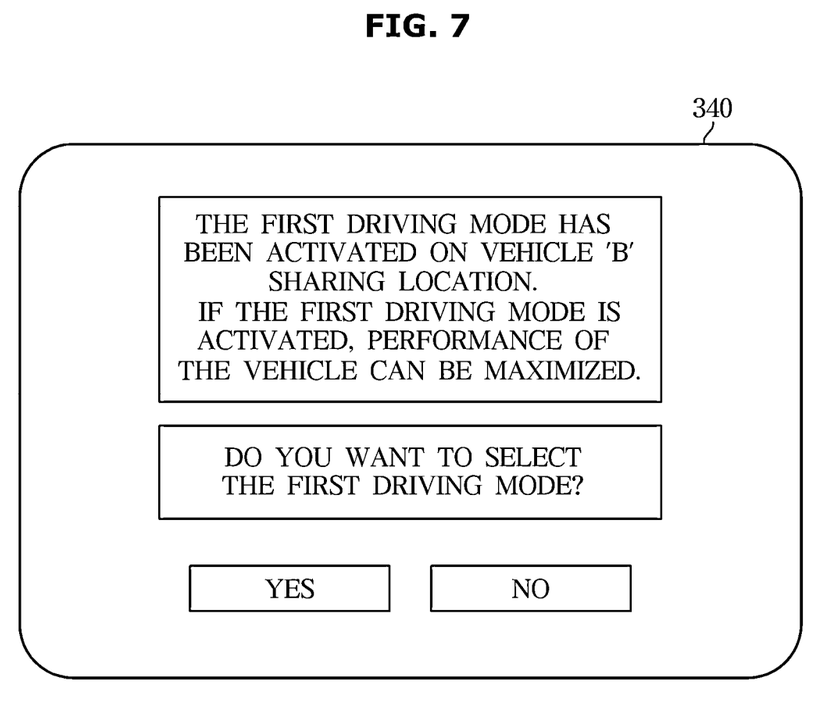

The controller 330 may determine whether driving in the first driving mode is possible based on the processing of the location information and battery information of the vehicle 1, and upon determining that driving in the first driving mode of the vehicle 1 is possible, control the display 340 to output a visual indication for inducing the selection of the first driving mode.

Referring to FIGS. 5-7, in at least one of the cases in which the destination of the vehicle 1 is set to a circuit, the distance between the location of the vehicle 1 and the circuit is less than or equal to a predetermined value or another vehicle that is sharing location with the vehicle 1 selects the first driving mode, the controller 330 may determine whether the vehicle 1 may drive in the first driving mode, and, if possible, may control the display 340 to output the visual indication for inducing selection of the first driving mode.

The screen displayed on the display 340 is not limited to as shown in the drawings, and may be pop-up separately in a new area.

Figure 8:
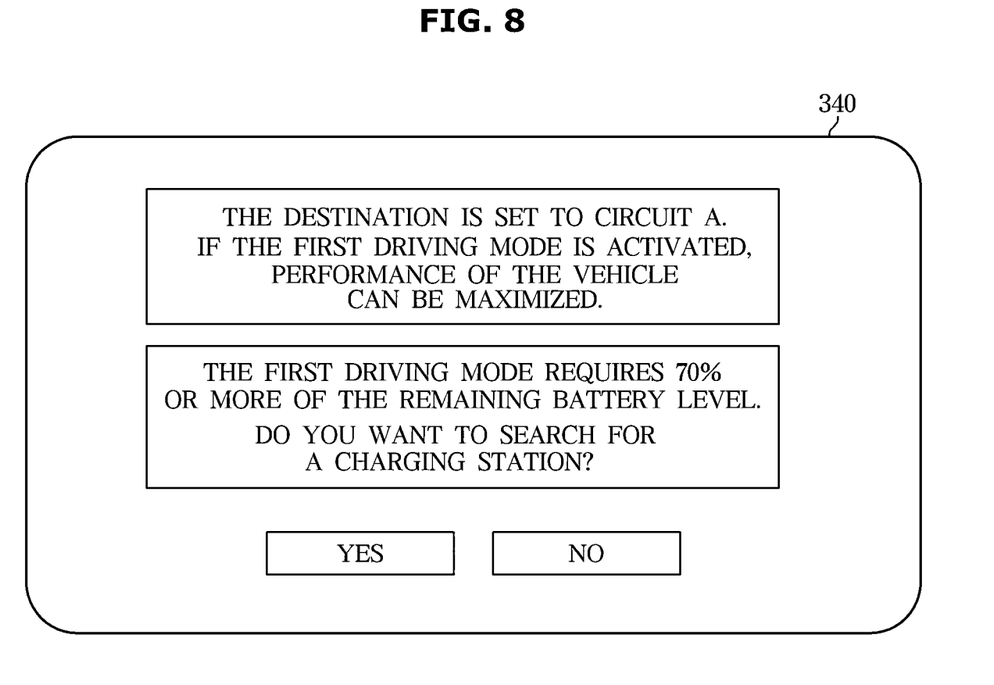

Referring to FIG. 8, in at least one of the cases in which the destination of the vehicle 1 is set to the circuit, the distance between the vehicle 1 and the circuit is less than or equal to the predetermined value or another vehicle that is sharing location with the vehicle 1 selects the first driving mode, the controller 330 may determine whether the vehicle 1 may drive in the first driving mode, and, if impossible, may control the display 340 to output the visual indication for inducing charging of the battery.

More specifically, when driving in the first driving mode is impossible due to a small charge amount of the battery, the controller 330 may control the display 340 to display a charging station search screen.

Figure 9:
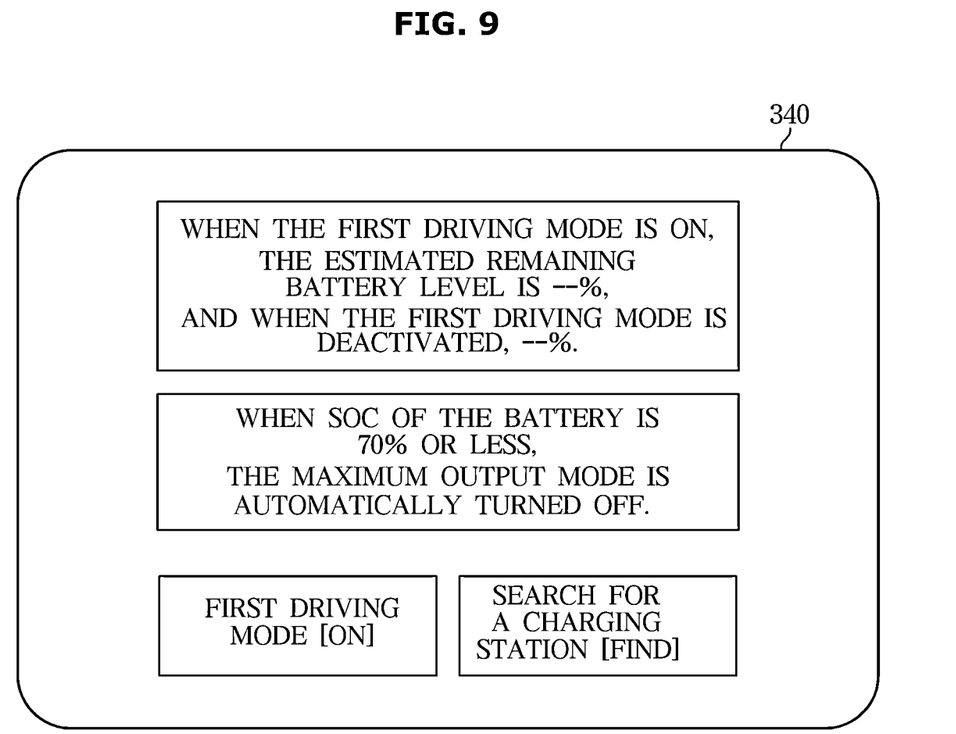

The controller 330 may calculate the remaining battery level according to the vehicle driving mode based on the circuit information received from the server 200 and the session information for the circuit input from the user, and control the display 340 to display the remaining battery level after driving according to the driving mode.

Referring to FIG. 9, the driver may select the driving mode or the charging station search by referring to the remaining battery level (or SOC) after driving according to the vehicle driving mode displayed on the display 340.

The driver may make a driving plan according to the driving mode, select the first driving mode without searching for the first driving mode selection menu when the first driving mode is selected according to the driving plan, and immediately search for a charging station upon determining that the charge amount of the battery is insufficient.

Figure 10:
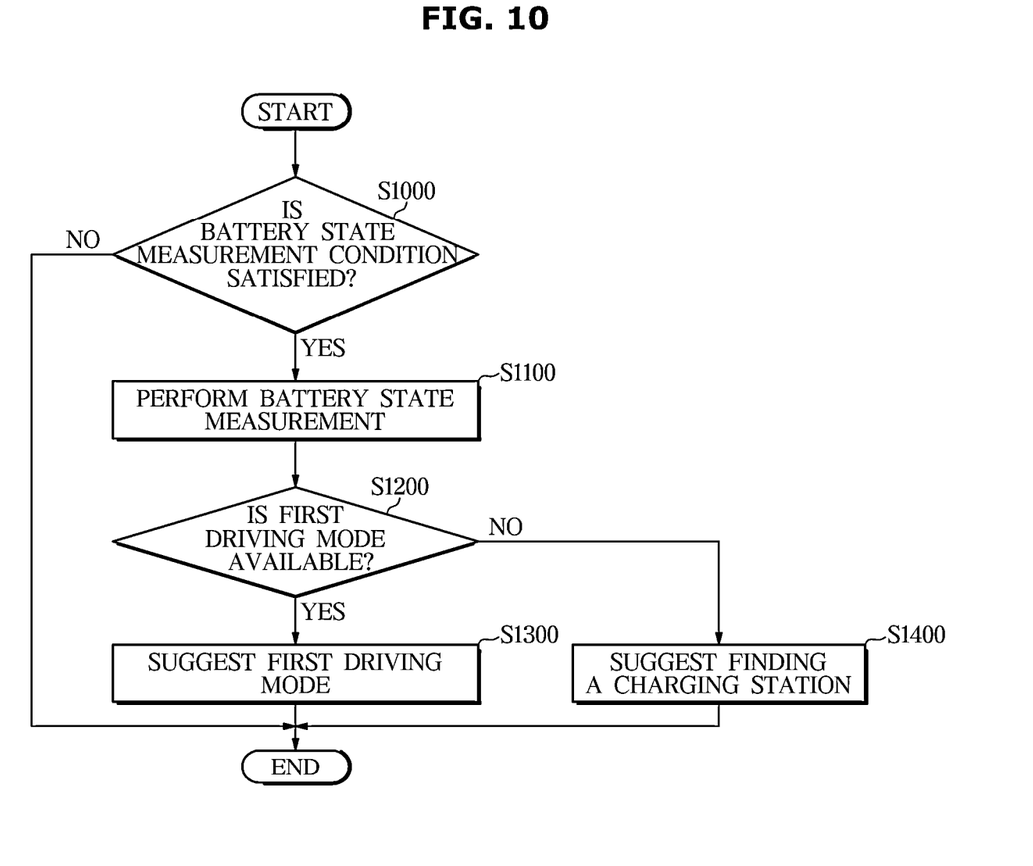
FIG. 10 is a flowchart illustrating a method of controlling a vehicle according to an embodiment of the present disclosure.

A method of controlling the vehicle as shown in FIG. 10 may be performed by the vehicle 1 described above. Accordingly, even if omitted below, the description of the vehicle 1 may be equally applied to the description of the method of controlling the vehicle.

Referring to FIG. 10, the vehicle 1 may determine whether a battery state measurement condition is satisfied (1000). The battery state measurement condition refers to a situation in which the vehicle 1 selects the first driving mode. For example, it refers to the fact that the destination of the vehicle 1 is set to the circuit, the distance between the vehicle 1 and the circuit is less than or equal to the predetermined value, or another vehicle that is sharing location with the vehicle 1 selects the first driving mode.

In response to the battery state measurement condition being satisfied, the vehicle 1 performs the battery state measurement (1100). The sensor 320 obtains battery information including a battery information capacity, a voltage signal, a current signal, and a temperature signal, and transmits the obtained information to the controller 330.

The controller 330 determines whether the vehicle 1 may drive in the first driving mode (1200). In other words, the controller 330 determines whether the vehicle 1 may drive in the first driving mode based on the battery information obtained from the sensor 320.

For example, in response to the remaining battery level being 70% or more, the controller 330 determines that the vehicle 1 may drive in the first driving mode, and in response to the remaining battery level being 70% or less, the controller 330 determines that the vehicle 1 may not drive in the first driving mode.

Upon determining that the vehicle 1 may drive in the first driving mode, the controller 330 may control the display 340 to output the visual indication for inducing selection of the driving mode (1300).

Upon determining that the vehicle 1 may not drive in the first driving mode, the controller 330 may control the display 340 to output the visual indication for inducing charging of the battery (1400).

As is apparent from the above, various embodiments of the present disclosure may provide convenience to the driver by visually outputting information such as a vehicle driving mode suggestion or the remaining battery level after driving based on vehicle information.

On the other hand, the above-described embodiments may be implemented in the form of a recording medium storing instructions executable by a computer. The instructions may be stored in the form of program code. When the instructions are executed by a processor, a program module is generated by the instructions so that the operations of the disclosed embodiments may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although embodiments of the disclosure have been shown and described, it should be appreciated by those having ordinary skill in the art that changes may be made in these embodiments without departing from the principles and spirit of the disclosure, the scope of which is defined in the claims and their equivalents.

What is claimed is:

1. A vehicle, comprising:
   at least one of an internal combustion engine or a motor;
   a display; and
   a controller configured to:
      control the display to output a visual indication for inducing selection of a predetermined first driving mode in response to a charge amount of a battery being greater than or equal to a predetermined value when at least one of location information of the vehicle or destination information of the vehicle satisfies a predetermined condition;
      control the display to output the visual indication for inducing selection of the first driving mode upon determining that the charge amount of the battery is greater than or equal to the predetermined value when any other vehicle sharing a location with the vehicle selects the first driving mode; and
      switch to the first driving mode based on a selection by a driver and to control to output maximum power,
   wherein the controller is further configured to:
      calculate the charge amount of the battery after driving based on circuit information received from a server; and
      generate a second driving mode in which the first driving mode is activated only in a straight section of a circuit based on the circuit information.

2. The vehicle of claim 1, wherein the controller is further configured to control the display to output the visual indication for inducing selection of the first driving mode upon determining that the charge amount of the battery is greater than or equal to the predetermined value when the destination information of the vehicle is a circuit.

3. The vehicle of claim 1, wherein the controller is further configured to control the display to output the visual indication for inducing selection of the first driving mode upon determining that the charge amount of the battery is greater than or equal to the predetermined value when a distance between the vehicle and a circuit is less than or equal to a predetermined value.

4. The vehicle of claim 1, wherein the controller is further configured to control the display to output a visual indication for inducing charging of the battery when the charge amount of the battery is less than the predetermined value.

5. The vehicle of claim 1, wherein the controller is further configured to calculate the charge amount of the battery based on session information on the circuit input from the driver.

6. The vehicle of claim 1, wherein the controller is further configured to control the display to output a visual indication including a remaining battery level after driving according to the first driving mode.

7. The vehicle of claim 1, wherein the controller is further configured to control the display to output a visual indication for inducing selection of the first driving mode or the second driving mode.

8. A method of controlling a vehicle, the method comprising:
   determining whether at least one of location information of the vehicle or destination information of the vehicle satisfies a predetermined condition;
   determining, if satisfied, whether a charge amount of a battery is greater than or equal to a predetermined value;
   controlling a display to output a visual indication for inducing selection of a predetermined first driving mode in response to the charge amount of the battery being greater than or equal to the predetermined value;
   controlling to switch to the first driving mode based on a selection by a driver and to control to output maximum power; and
   controlling the display to output the visual indication for inducing selection of the first driving mode upon determining that the charge amount of the battery is greater than or equal to the predetermined value when any other vehicle sharing a location with the vehicle selects the first driving mode,
   wherein the method further comprises:
      calculating the charge amount of the battery after driving based on circuit information; and
      generating a second driving mode in which the first driving mode is activated only in a straight section of a circuit based on the circuit information.

9. The method of claim 8, further comprising:
   controlling the display to output the visual indication for inducing selection of the first driving mode upon determining that the charge amount of the battery is greater than or equal to the predetermined value when the destination information of the vehicle is a circuit.

10. The method of claim 8, further comprising:
    controlling the display to output the visual indication for inducing selection of the first driving mode upon determining that the charge amount of the battery is greater than or equal to the predetermined value when a distance between the vehicle and a circuit is less than or equal to a predetermined value.

11. The method of claim 8, further comprising:
    controlling the display to output a visual indication for inducing charging of the battery when the charge amount of the battery is less than the predetermined value.

12. The method of claim 8, wherein the calculating of the charge amount further comprises:
    calculating the charge amount of the battery based on session information on the circuit input from the driver.

13. The method of claim 8, wherein the controlling of the display further comprises:
    controlling the display to output a visual indication including a remaining battery level after driving according to the first driving mode.

14. The method of claim 8, further comprising:
    controlling the display to output a visual indication for inducing selection of the first driving mode or the second driving mode.

* * * * *